(12) United States Patent
Schoen et al.

(10) Patent No.: US 6,378,933 B1
(45) Date of Patent: Apr. 30, 2002

(54) REINFORCED VEHICLE FRAMING

(75) Inventors: Robert M Schoen, West Bloomfield; Rao Nuthalapati, Auburn Hills; Pamela E Larson, Rochester; Nicol M Erickson, Clawson; Haili Zhou, Rochester Hills, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/706,925

(22) Filed: Nov. 6, 2000

(51) Int. Cl.[7] .................................................. B60J 7/00
(52) U.S. Cl. ........................ 296/188; 296/209; 296/187; 296/203.02; 296/203.03
(58) Field of Search ............................... 296/188, 209, 296/187, 203.02, 203.03

(56) References Cited

U.S. PATENT DOCUMENTS

| | | | | |
|---|---|---|---|---|
| 5,016,895 A | * | 5/1991 | Hollingsworth et al. | 280/280 |
| 5,102,188 A | * | 4/1992 | Yamane | 296/187 |
| 5,124,186 A | * | 6/1992 | Wycech | 296/188 |
| 5,213,391 A | * | 5/1993 | Takagi | 296/205 |
| 5,544,933 A | * | 8/1996 | Shahab et al. | 296/188 |
| 5,580,116 A | | 12/1996 | Patel et al. | |
| 5,595,415 A | | 1/1997 | Beaulat | |
| 5,609,385 A | * | 3/1997 | Daniel et al. | 296/188 |
| 5,660,426 A | | 8/1997 | Sugimori et al. | |
| 5,678,826 A | | 10/1997 | Miller | |
| 5,700,050 A | | 12/1997 | Gonas | |
| 5,720,510 A | * | 2/1998 | Daniel et al. | 296/188 |
| 5,806,919 A | | 9/1998 | Davies | |
| 5,871,253 A | | 2/1999 | Erber | |
| 5,884,960 A | * | 3/1999 | Wycech | 296/146.6 |
| 5,908,216 A | * | 6/1999 | Townsend | 296/146.6 |
| 5,997,077 A | | 12/1999 | Siebels et al. | |
| 6,073,992 A | * | 6/2000 | Yamauchi et al. | 296/203.01 |
| 6,082,811 A | * | 7/2000 | Yoshida | 296/188 |
| 6,096,403 A | * | 8/2000 | Wycech | 296/188 |
| 6,135,542 A | * | 10/2000 | Emmelmann et al. | 296/205 |
| 6,193,306 B1 | * | 2/2001 | Lee | 296/209 |
| 6,199,940 B1 | * | 3/2001 | Hopton et al. | 296/203.01 |
| 6,217,109 B1 | * | 4/2001 | Okana et al. | 296/203.03 |

* cited by examiner

*Primary Examiner*—Ken Patel
(74) *Attorney, Agent, or Firm*—Ralph Edwin Smith

(57) ABSTRACT

As automotive vehicle frame can be strengthened by reinforcing the tubular frame elements that form the side door openings. A three dimensional core element and rigid foam can be incorporated into each tubular frame element to achieve a significant increase in the frame bending strength, without adding appreciable weight to the vehicle frame.

7 Claims, 2 Drawing Sheets

REINFORCED VEHICLE FRAMING

FIELD OF THE INVENTION

This invention relates to an automotive vehicle framing system, and particularly to a vehicle framing system that includes a hollow sill having enhanced resistance against bending or torsional load forces while providing optimal vibration characteristics, also considering impact concerns.

BACKGROUND AND SUMMARY OF THE INVENTION

A typical automotive or light truck body would include underbody frame rails and body side apertures/sides sills that form the door surround structure. These are major structural components that determine overall body stiffness and the location of the first torsion and bending nodes. The present invention is concerned with the strengthening of these structures, in this case with a variable cross section structural foam. The varied cross section would be used to position the node for optimal vibration characteristics for the vehicle occupants and improved impact response, without unduly increasing the weight of the vehicle.

One preferred embodiment of the invention includes a tubular side structure that has an elongated hollow sill with a rigid lightweight insert extending within the hollow sill to surrounded by structural polymer foam give the sill an enhanced resistance against bending or torsional load forces.

In order to minimize the overall weight of the side frame, a relatively lightweight elongated three dimensional core is located within the sill; the rigid polymer foam has an inner surface bonded to the elongated core, and an outer surface bonded to the interior surface of the hollow sill. The core is preferably formed as a hollow tubular element to reduce the core weight. The light weight core occupies a significant portion of the sill interior space, thereby reducing the amount (mass) of rigid polymer foam required to stiffen the hollow sill against bending or torsional load forces.

Specific features of the invention will be apparent from the attached drawings and description of a preferred embodiment of the invention.

DESCRIPTION OF A PREFERRED EMBODIMENT OF THE INVENTION

Figure 1:
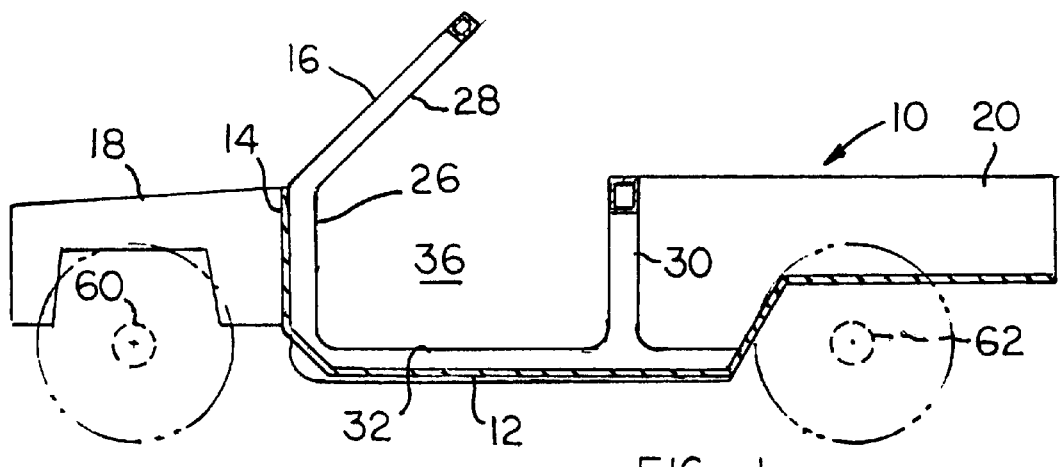
FIG. 1 is a longitudinal sectional view taken through an automotive vehicle body having a framing system constructed according to the invention

Referring to FIG. 1, there is shown an automotive vehicle body 10 that includes a floor panel 12 connected to an upstanding firewall 14. Side edge areas of floor panel 12 and firewall 14 are rigidly attached to two upright side frames 16. Each side frame is a mirror image of the other side frame, so that the vehicle body is symmetrical relative to the longitudinal centerline of floor panel 12. The frame elements are usually steel stampings having tubular cross sections.

The vehicle body includes two front panels 18 extending forwardly from dash panel or firewall 14 and two rear panels 20 extending rearwardly from side frames 16. The side frames are tubular in nature, so as to contribute a desired rigidity to the vehicle body. Each tubular frame 16 includes a front tubular pillar 26 and a rear tubular pillar 30. A lower tubular sill 32 interconnects the lower ends of the tubular pillars to from a support mechanism for the floor panel 12. The upper portion 28 of each front pillar forms a support structure for as front windshield (not shown). Each side frame 16 forms a door opening 36.

The side frame construction depicted in FIG. 1 is used for a convertible type vehicle. Other vehicle types, such as four door sedan, two door sedan, or van will have a differently configured side frame construction. However, a common feature of the various side frame constructions is that the frame members that define the side door openings have tubular cross-sections, in order that the vehicle body cab be adequately supported against twisting, bending or distortion. The tubular door-support frames 16 give the vehicle frame a desired dimensional stability under high load conditions.

Figure 5:
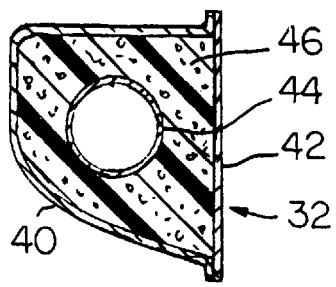
FIG. 5 is a transverse sectional view taken on line 5—5 in FIGS. 2 and 4.
Figure 6:
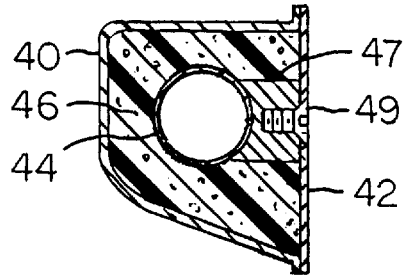
FIG. 6 is a transverse sectional view taken on line 6—6 in FIG. 4.

Typically the tubular frame members 26, 30 and 32 are of two piece construction, as shown in FIGS. 5 and 6. Referring particularly to FIG. 5, the hollow sill member 32 consists of an outer formed sheet metal member 40 having a channel-like cross section, and a second generally flat inner metal sheet 42 secured to the confronting edges of metal sheet 40, as by welding. The tubular sill member serves as a reinforcing member for side frame 16. Pillars 26 and 30 of the side frame are tubular in nature, although not necessarily the same cross sectional configuration as the sill member.

The present invention relates to an internal strengthening mechanism for stiffening the hollow tubular frame members, particularly the hollow tubular sill member 32. The illustrated strengthening mechanism includes an elongated hollow core 44 suitably attached to sheet 42 of the hollow sill member, and a rigid polymer foam 46 occupying the internal sill space not occupied by core 44. As shown in FIGS. 5 and 6, the rigid polymer foam completely encircles core 44, except for the areas of the core that are attached to sheet 42 of the sill member.

Figure 4:
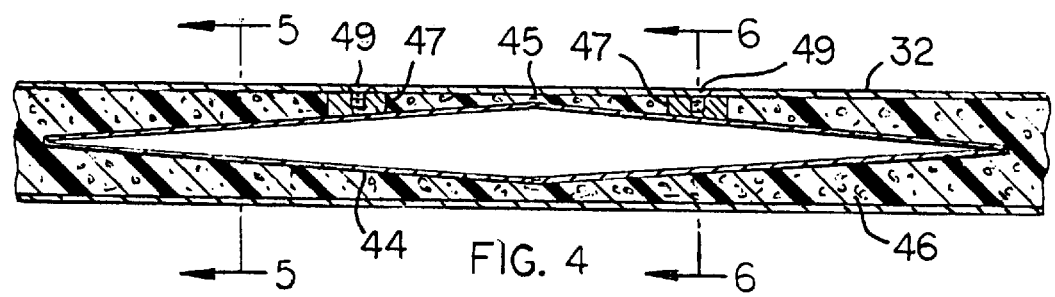
FIG. 4 is a longitudinal sectional view taken on line 4—4 in FIG. 3.

Various attachment mechanisms can be used for attaching hollow core 44 to sheet 42 of the sill member. As shown in FIGS. 4 and 6, core 44 is attached to sheet 42 by means of two spacers 47 and associated screws 49 that extend through sheet 42 into threaded holes in the spacers; the spacers may be adhesively attached to core 44 or molded as part of the core. The spacers 47 can be formed of an insulating material to isolate core 44 from any welding heat that might be associated with the operation of connecting sheets 40 and 42. The spacers serve to locate core 44 centrally in the hollow sill 32, so that the core is generally coaxial with the sill.

Figure 2:
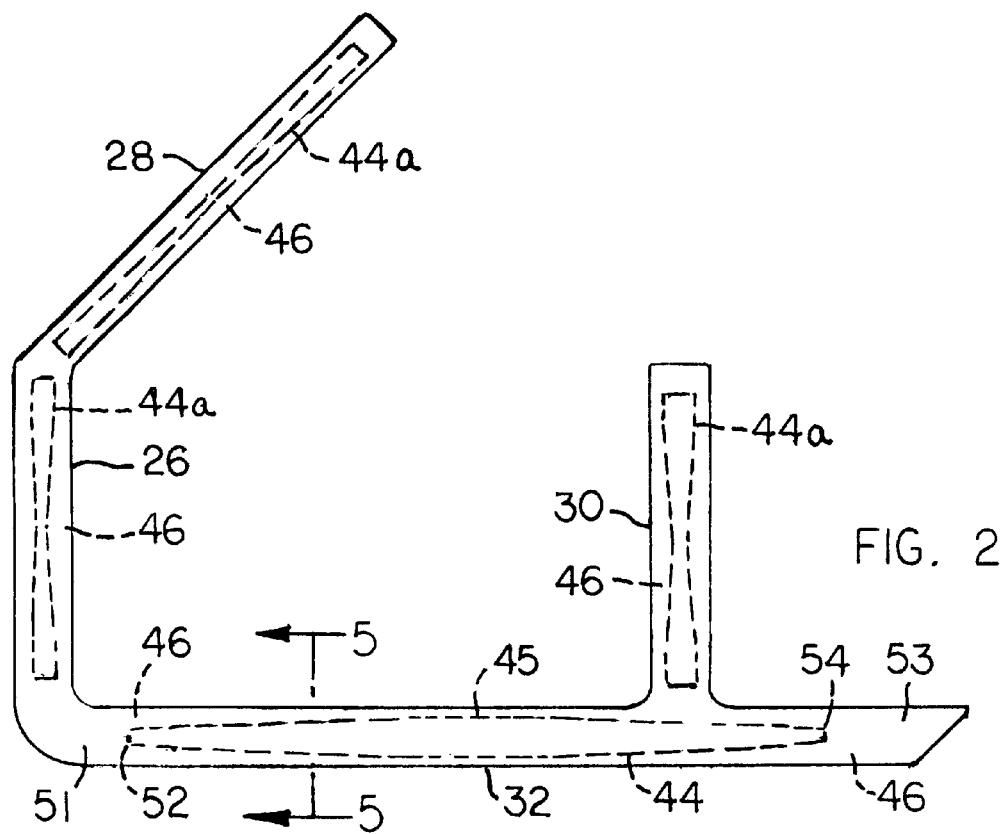
FIG. 2 is an enlarged side elevational view of a vehicle framing system used in the FIG. 1 vehicle.

With such an arrangement, the rigid polymer foam 46 completely encircles core 44 so that the foam is continuous from the front end of the sill member to the rear end of the sill member. In FIG. 2, the front end of the sill member is designated by numeral 51; the rear end of the sill is designated by numeral 53. Corresponding ends of core 44 are designated by numerals 52 and 54.

In preferred practice of the invention, the length of core 44 is somewhat less than the length of sill 32, so that the extreme end sections of the sill are completely occupied by rigid polymer foam 46. The extreme end sections of the sill exhibit maximum resistance to bending load forces (because the entire sill cross section is foam-filled at such points). Having full foam at the ends may also enhance impact performance.

Figure 3:
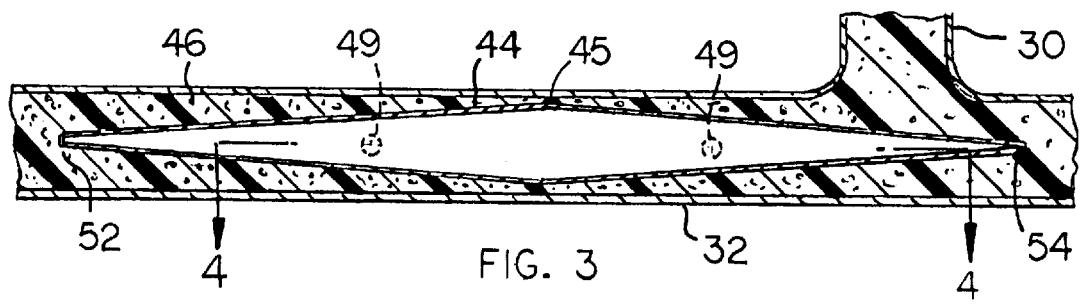
FIG. 3 is a fragmentary longitudinal sectional view taken through a sill member that forms a part of the FIG. 2 vehicle framing system.

It will be seen from FIGS. 2 through 4 that core 44 is tapered in opposite directions from a point 45 located at the desired nodal point between core ends 52 and 54. Core nodal point 45 has a relatively large circular diameter approaching the internal cross sectional area of hollow sill 32. The core tapers from mid point 45 in both the forward and rearward directions, at approximately a constant rate. As shown in FIGS. 5 and 6, core 44 has a circular cross section in the transverse direction. In the longitudinal direction the core can be visualized as having two frusto-conical sections arranged in back-to-back relations.

In order to minimize the core weight, the core is preferably formed as a hollow tubular member having a relatively thin wall, with sufficient hoop strength to support the rigid foam 46 against collapse. Ends 52 and 54 are closed to prevent any migration of the foam into the core 44 interior space.

Core 44 is attached to sheet 42 prior to the operation of joining sheet 42 to the pre-formed channel-shaped sheet 40. After sheet 42 has been joined to sheet 40, as by welding, the rigid polymer foam 46 is incorporated into the tubular sill by an in situ foam expansion process, using drilled holes in sheet 42 to introduce the polymer foam ingredients into the tubular sill.

Resin, catalyst and expanding agent are pumped into the tubular sill 32, so that foam-expansion of the polymer takes place within the sill interior space. The ingredient ratio is selected so that the foam is a rigid closed cell foam material having an internal stiffening effect on the tubular sill 32.

Core 44, is tapered in opposite directions (from nodal point 45) so that the bending resistance of sill 32 is varied along the sill member length. At its front and rear ends 51 and 53, the sill exhibits maximum bend (or twist) resistance. The location of point 45 of core 44, becomes the engineered bending and twist nodal point to provide minimal vibration for the vehicle occupants, in accordance with the expected loads imposed on the sill by road forces.

Figure 7:
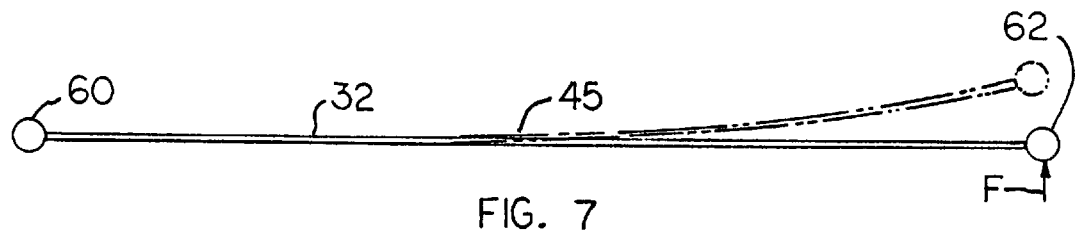
FIG. 7 is a schematic representation of a bending action that can occur in a vehicle framing system during vehicle operation over uneven terrain.

FIG. 7, depicts in rudimentary fashion sill loadings that can be expected. In FIG. 7, the front and rear axles of the vehicle are schematically indicated at 60 and 62. For illustration purposes sill 32 is shown as a flexible leaf extending between the two axles.

Assuming the terrain were to exert an upward force F on rear axle 62, the flexible leaf (sill) 32 could be expected to be displaced (or bent) upwardly toward the dashed line position. Maximum bending deflection occurs proximate to axle 62; the bending deflection becomes progressively less in the leaf sections located incrementally away from axle 62.

It will be appreciated that if the upwardly directed force F were to be imposed on the front axle 60, leaf 32 would have a mirror image deflection. In practice, the road forces act randomly, so as to produce a variable rocking motion of each sill in a vibrational mode. The present invention relates to a sill strengthening mechanism for enabling the sill to adequately respond to the vibrational forces.

In order to rigidify sill 32 against the FIG. 7 bending forces, it is necessary to provide the stiffening forces predominately near the ends of the sill; there is a lessened need for rigidification of the sill at the sill nodal point 45. The core 44 is configured to concentrate the rigidifying foam 46 near the ends of sill 32, in accordance with the expected road loadings. Core 44 reduces the mass of rigid foam required to produce a desired sill response to road forces.

Preferably the rigid foam filler is produced by an in-situ process, wherein the foam ingredients pre-pumped into the sill interior space. So that the foam bonds to the outer surface of core 44 and the inner surfaces of the sill 32 walls.

In preferred practice of the invention, pillars 26 and 30 are also rigidified by rigid foam fillers. As in the case of sill 32, light weight cores can be located within the pillar interior spaces, to minimize the mass of rigid foam material required to produce a pillar-rigidifying action. FIG. 2 shows cores 44a, of varying shapes, located within the pillars. The core shape is influenced to a great extent by the load forces. As shown in FIG. 2, cores 44a have hour-glass configurations.

As previously noted, the invention can be used in convertible vehicles, as well as sedans and vans. The convertible vehicle is of primary interest, since the side frames on such vehicles are required to have increased structural characteristics since there is no roof structure.

The drawings illustrate mechanisms for incorporating rigid plastic foam and a three dimensional core element into a tubular side frame member. It will be appreciated that variations can be made in the cross sectional shape of the tubular frame member and core element. The shapes of the sill members and pillars are determined to some extent by ornamental design factors. Various cross sectional shapes can be used. Each core element preferably extends substantially the entire length of the associated tubular frame element; the ends of each strengthener tube are closed to prevent the plastic foam from entering into the core element interior space. The invention can be applied not only to the pillars and sill members, but also to the roof rails and the roof bows on sedan bodies and van bodies.

What is claimed:

1. An automotive vehicle framing system comprising:

a tubular side frame defining a door opening; said side frame comprising a hollow sill forming a lower edge of the side frame;

a three dimensional core extending longitudinally within said hollow sill; and rigid polymer foam extending within said sill to reinforce the sill against bending loads, the rigid polymer foam extending between an inner surface of the sill and the core, wherein said core includes a midsection; a forward side surface tapered from the core midsection to a front end, and a rearward side surface tapered from the core midsection to a rear end.

2. The framing system of claim 1, wherein said core is hollow.

3. The framing system of claim 1, wherein side core has a circular cross section in the transverse direction.

4. The framing system of claim 1; and further comprising means for anchoring said core to an interior surface of the hollow sill so that the core is generally coaxial with the sill.

5. The framing system of claim 4, wherein said rigid foam is continuous from a front end of the sill to a rear end of the sill.

6. The framing system of claim 1, wherein the vehicle is a convertible.

7. The framing system of claim 1, wherein said tubular side frame includes a hollow front pillar extending upwardly from said hollow sill, a hollow rear pillar extending upwardly from said hollow sill, and wherein each pillar includes:

a three dimensional core extending longitudinally therein; and rigid polymer foam extending therein between an inner surface of the pillar and the core to reinforce the pillar against bending loads.

* * * * *